Nov. 21, 1950     A. J. ORTUSI ET AL     2,530,905
AIRCRAFT ALTIMETER, PARTICULARLY
APPLICABLE TO LOW ALTITUDES
Filed April 30, 1947     2 Sheets-Sheet 1
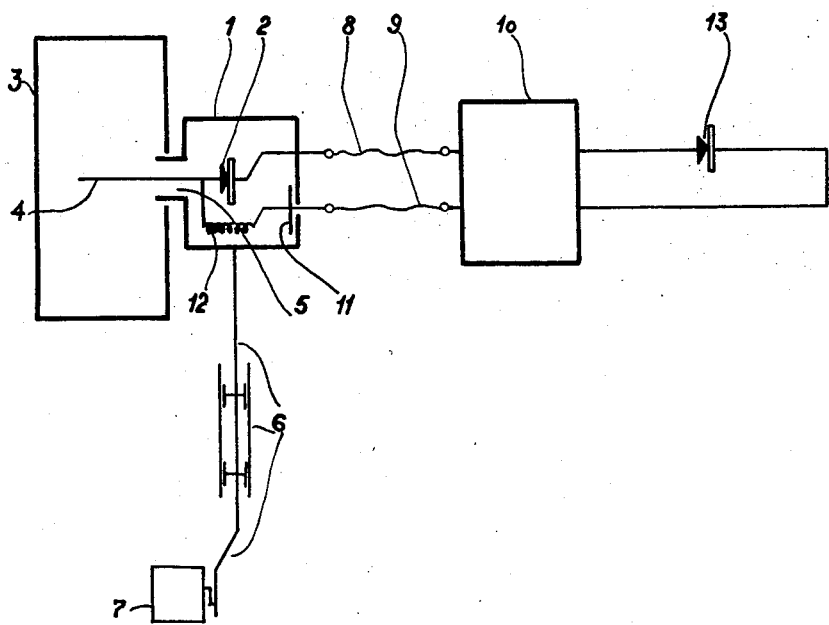
FIG_1
INVENTORS:
MAURICE PONTE & ANTOINE JEAN ORTUSI
By John B. Brady
attorney

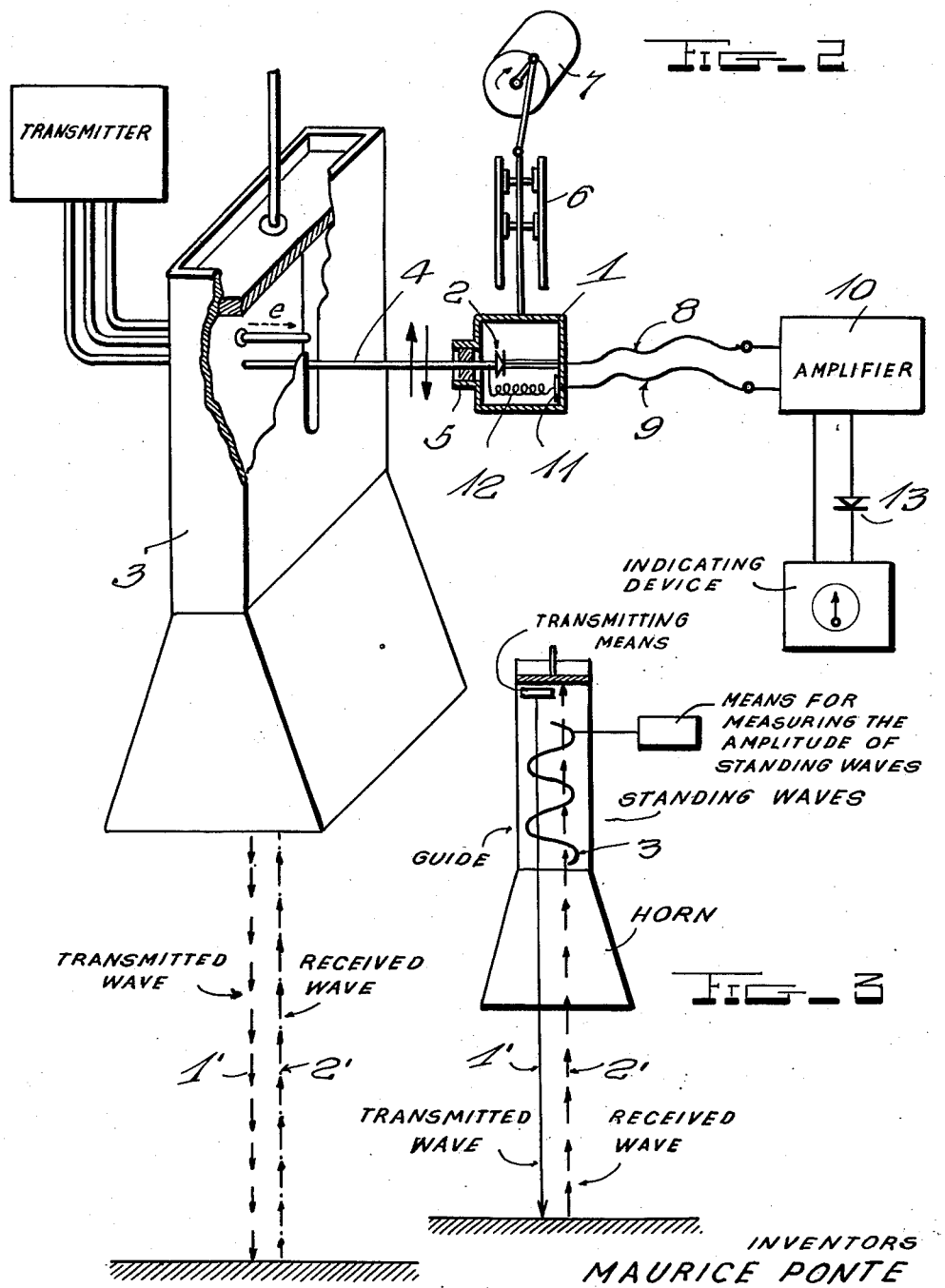

Patented Nov. 21, 1950

2,530,905

UNITED STATES PATENT OFFICE 2,530,905

AIRCRAFT ALTIMETER, PARTICULARLY APPLICABLE TO LOW ALTITUDES

Antoine Jean Ortusi and Maurice Ponte, Paris, France, assignors to Compagnie Generale de Telegraphie Sans Fil, a corporation of France Application April 30, 1947, Serial No. 744,843 In France April 6, 1946

Section 1, Public Law 690, August 8, 1946 Patent expires April 6, 1966

3 Claims. (Cl. 343—12)

The present invention relates to an aircraft altimeter particularly applicable to low altitudes. According to the invention, this altimeter is so designed that its accuracy increases when the aircraft approaches the ground. It is based on the possibility of fixing the height of the aircraft above a landing ground, determined by measuring the coefficient of reflection of a centimetric wave emitted on board the aircraft, diffracted by a small horn and reflected by the ground.

The modulus of this coefficient is, on the one hand, proportional to the coefficient of reflection from the ground of the landing place, and it varies, on the other hand, inversely with the distance from the aircraft to the ground and the length of wave employed; it is therefore advantageous to use as short a wave length as possible. For example, for a horn surface of 30 cm. x 30 cm. and a wave length of 3 cm., the coefficient of reflection is of the order of $1/100$ for a distance of say a hundred metres.

According to the invention, the estimation of the height of the aircraft above the ground will be made by means of a rapid and precise measurement of the modulus of the coefficient of reflection, a measurement based on the fact that in traveling waves, the field being constant the whole length of a guide, a detector which was shifted longitudinally on the guide would give a fixed indication. On the other hand, if there existed a factor of reflection different from zero, the amplitude of the electric field would show a sinusoidal variation corresponding to the displacement of the detector along the guide. Under these conditions, if V indicates the speed of displacement of the detector and $\lambda$ the length of wave employed, the frequency of the current detected will be equal to $2V/\lambda$; and it will be seen that it is still advantageous to operate with a short wave length in such manner as to increase the value of the low frequency, which assists the amplification. For example, for a velocity V of 1 metre/second and a wave length of 3 cm. there is given a frequency of 60 periods per seconds.

The carrying out of the above principle will be made for example by means of a device such as that shown diagrammatically in the accompanying drawings in which:

Figure 1 diagrammatically illustrates the arrangement of apparatus in the system of our invention;

Fig. 2 is a schematic view of the apparatus shown in Fig. 1, showing its application to an altimeter for aircraft; and Fig. 3 is a theoretical diagram explaining the principles of our invention.

The apparatus comprises two parts. A movable part is constituted by a shuttered box 1 containing a crystal detector 2 connected to the interior of the guide 3 by a small aerial 4; this box can slide, with a reciprocating motion, along the guide 3 due to a slot 5 edged by two slides. The box 1 is driven by a system of connecting rods and crank 6 actuated by a motor 7, the rotational speed of which fixes the value of the low frequency. After elimination of the continuous current detected, the alternating potential taken off at two points of the shuttered box 1 is transmitted by flexible wires 8, 9 to the inlet of a low frequency amplifier 10; one of the collecting points 9 takes place furthermore through the intermediation of a high frequency condenser 11 connected to the crystal detector 2 by means of a shock self-inductance 12 of high frequency.

The fixed part of the apparatus is constituted, on the one hand, by the guide 3 provided with a diffraction horn shown more clearly in Fig. 2, the aperture of which is directed towards the ground and, on the other hand, by the low frequency amplifier 10, at the outlet of which the current passes into a low frequency detector 13.

The theory of operation will be understood by a consideration of Fig. 3 which we explain as follows:

(a) By means of a practically vertical guide 3 closed at its uppermost end and open at the other end, this latter opening particularly into a horn, there is transmitted an ultra-short wave 1' with a fixed and stable frequency, the transmitting means being arranged in the guide on the side of its closed end.

(b) In this same guide, reflected waves 2' are received, these waves determining by their superposition with the transmitted waves 1' the production of stationary waves. The amplitude of these latter waves will be all the larger, as the guide carried on board an airplane approaches the ground: this amplitude is then a function of the height of the plane above the ground.

(c) Finally the amplitude of these waves is measured by appropriate means and this measure is transformed into an indication of the height.

The amplitude of the stationary waves depends on the intensity of the reflection of the waves transmitted to the ground, the intensity depending itself on the height of the airplane.

The principle of operation of the apparatus thus constituted is such that, when the aircraft approaches the ground, the low frequency current detected becomes greater and greater so that if the frequency of displacement of the shuttered box is suitable a telephone, or a loudspeaker, connected directly in the plate circuit of the output valve of the low frequency amplifier, emits a noise of sufficient intensity to warn the pilot of the proximity of the ground. The apparatus according to the invention therefore serves as a warning device.

If the value of the coefficient of reflection of the landing ground or runways is fixed—in the majority of cases this coefficient is of the order of 80%—the apparatus may also serve as altimeter on these grounds or runways. It will, in fact, be sufficient to arrange, in the circuit of the low frequency current detected, a milliampere meter which indicates currents which are all the more intense the lower the aircraft flies, and which can be calibrated directly in altitudes.

A particularly appreciable advantage of the above measurement process lies in the fact that account does not have to be taken of the phase of the reflected wave with respect to that of the incident wave since, in fact, only the modulus of the coefficient of reflection is measured. On the other hand, the accuracy of the measurement increases as the distance of the aircraft from the ground diminishes, so that the apparatus is shown to be an extremely reliable instrument in landing without visibility.

What we claim is:

1. An altimeter comprising a guide closed at one end with the other end open and directed toward the terrestrial surface, means placed on the side of the closed end for transmitting in said guide an ultra-short wave with a fixed and stable frequency for producing by reflection on the said terrestrial surface and reception of the reflected waves stationary waves on the inside of the said guide, a movable electric coupling element disposed inside the said guide between the said transmitting means and the said open end in the field of the said stationary waves and sensitive to these waves, means for animating the said element with a reciprocative movement in the direction of the longitudinal axis of the guide for inducing in the said element a potential which is a function of the amplitude of the said waves, means for measuring the said potential and means for transforming the measure of the said potential into an indication of the height.

2. An altimeter comprising a guide closed at one end with the other end open and directed toward the terrestrial surface, means placed on the side of the closed end for transmitting in said guide an ultra-short wave for producing by reflection on the said terrestrial surface and reception of the reflected waves, stationary waves on the inside of the said guide, the amplitude of the said waves being a function of the height above the ground, a movable detector outside the guide and coupled laterally to the latter by a small antenna penetrating to the inside of the guide and across a longitudinal slot provided in the side of the guide and between the said transmitting means and the said open end, means for animating the said detector with a reciprocative movement the length of the guide in such a way as to induce in the said detector a potential which is a function of the amplitude of the said stationary waves, means connected to the said detector for eliminating the high frequency and the continuous component of the said potential, a low frequency amplifier connected to said latter means, a low frequency detector connected to the said amplifier, and an indicating device connected to the latter detector, and operating to furnish an indication of the height.

3. An altimeter comprising a wave guide of rectangular section carried by aircraft and closed at one end with the other end provided with a horn directed towards the terrestrial surface, means placed on the side of the closed end for transmitting in said guide an $H_01$ type wave, a crystal detector outside the guide and connected laterally to the latter by a probe penetrating to the inside of the guide across a longitudinal slot provided in the side of the guide and parallel to the electrical field vector of the $H_01$ wave, and between the said transmitting means and the said closed end, a protected box operating as a baffle and containing the said detector rigidly connected to the said box, a crank-link-device, connected to the said box and operating to impart reciprocative movement thereto along the length of the said guide, the said probe being displaced along the said slot, means connected to the detector for eliminating the high frequency wave and the continuous wave component, a low frequency amplifier connected to said latter means, a low frequency detector connected to the said amplifier, and an indicating device connected to this latter detector, and operating to provide the indication of the height of the aircraft above the terrestrial surface.

MAURICE PONTE.
ANTOINE JEAN ORTUSI.

REFERENCES CITED

The following references are of record in the file of this patent:

UNITED STATES PATENTS

| Number | Name | Date |
|---|---|---|
| 1,969,537 | Alexanderson | Aug. 7, 1934 |
| 2,020,347 | Ballantine | Nov. 12, 1935 |
| 2,045,072 | Espenschied | June 23, 1936 |
| 2,134,535 | Runge | Oct. 25, 1938 |
| 2,206,036 | Herson | July 2, 1940 |
| 2,231,929 | Lyman | Feb. 18, 1941 |